US 11,965,585 B2

United States Patent
Long et al.

(10) Patent No.: US 11,965,585 B2
(45) Date of Patent: Apr. 23, 2024

(54) ELECTRIC VEHICLE MULTI-SPEED TRANSMISSION WITH INTEGRATED FIXED REDUCER GEAR SET

(71) Applicant: Integrated Electric Drives, Inc., Arvada, CO (US)

(72) Inventors: Michael Long, Jonestown, PA (US); Jeffrey Barber, Arvada, CO (US)

(73) Assignee: Integrated Electric Drives, Inc., Arvada, CO (US)

( * ) Notice: Subject to any disclaimer, the term of this patent is extended or adjusted under 35 U.S.C. 154(b) by 0 days.

(21) Appl. No.: 18/505,347

(22) Filed: Nov. 9, 2023

(65) Prior Publication Data

US 2024/0068552 A1  Feb. 29, 2024

Related U.S. Application Data

(63) Continuation of application No. PCT/US2023/067300, filed on May 22, 2023.
(Continued)

(51) Int. Cl.
*F16H 37/04* (2006.01)
*B60K 1/00* (2006.01)
(Continued)

(52) U.S. Cl.
CPC .............. *F16H 37/04* (2013.01); *B60K 1/00* (2013.01); *F16H 57/021* (2013.01);
(Continued)

(58) Field of Classification Search
CPC ............................... F16H 37/04; F16H 57/021
(Continued)

(56) References Cited

U.S. PATENT DOCUMENTS 4,846,018 A * 7/1989 Matsumoto .............. B25J 9/102
475/179
6,244,413 B1  6/2001 Gutmann et al.
(Continued)

FOREIGN PATENT DOCUMENTS

CN 205423703 U 8/2016
CN 108973662 A 12/2018
(Continued)

OTHER PUBLICATIONS

PCT International Search Report and Written Opinion in International Application PCT/US2023/067300, dated Aug. 24, 2023, 30 pages.
(Continued)

*Primary Examiner* — Ha Dinh Ho
(74) *Attorney, Agent, or Firm* — Merchant & Gould P.C.

(57) ABSTRACT

A powertrain system for a commercial electric vehicle includes an electric motor, a multi-speed transmission, and a drive line. A reducer assembly is added prior to connection to the drive line to decease the rotational speed generated by the electric motor prior to being transmitted to the drive line. The reducer assembly can be placed before the multi-speed transmission input, after the multi-speed transmission output, or somewhere in between those two locations. The reducer assembly includes a reducer gearset for decreasing shaft rotational speed. The reducer assembly may include adjacent idler gears to reduce the pressure load on the gear teeth of the reducer assembly.

19 Claims, 8 Drawing Sheets

Related U.S. Application Data

(60) Provisional application No. 63/344,710, filed on May 23, 2022.

(51) Int. Cl.
  *F16H 57/021* (2012.01)
  *F16H 57/02* (2012.01)

(52) U.S. Cl.
  CPC ............. *F16H 2057/02034* (2013.01); *F16H 2057/0206* (2013.01); *F16H 2057/0216* (2013.01); *F16H 2200/0021* (2013.01); *F16H 2200/0034* (2013.01)

(58) Field of Classification Search
  USPC .......................................................... 337/661
  See application file for complete search history.

(56) References Cited

U.S. PATENT DOCUMENTS

| | | | |
|---|---|---|---|
| 6,746,356 B2 | 6/2004 | Pengilly | |
| 7,520,351 B2 | 4/2009 | Uchisasai et al. | |
| 7,665,513 B2 | 2/2010 | Sasaki | |
| 8,382,629 B2 * | 2/2013 | Hirata | F16H 1/32 475/162 |
| 8,689,741 B2 | 4/2014 | Park et al. | |
| 8,915,818 B2 * | 12/2014 | Gunji | B60K 17/046 180/372 |
| 10,132,403 B1 | 11/2018 | Gooden et al. | |
| 10,457,135 B2 | 10/2019 | Tang et al. | |
| 10,940,751 B2 | 3/2021 | Matsuda et al. | |
| 2015/0300461 A1 * | 10/2015 | Tamai | F16H 3/727 475/5 |
| 2020/0340376 A1 | 10/2020 | Slesinki et al. | |

FOREIGN PATENT DOCUMENTS

| | | |
|---|---|---|
| EP | 2945958 | 1/2017 |
| JP | 201324573 | 12/2013 |
| KR | 20050010440 | 1/2005 |
| KR | 102183332 | 11/2020 |

OTHER PUBLICATIONS

Palermo et al., The measurement of Gear Transmission Error as an NVH indicator: Theoretical discussion and industrial application via low-cost digital encoders to an all-electric vehicle gearbox, 2018, 22 pages.

* cited by examiner

ELECTRIC VEHICLE MULTI-SPEED TRANSMISSION WITH INTEGRATED FIXED REDUCER GEAR SET

CROSS-REFERENCE TO RELATED APPLICATIONS

This application is a continuation of PCT International Patent Application No. PCT/US2023/067300, filed on May 22, 2023, which claims priority to U.S. Provisional Patent Application No. 63/344,710, filed May 23, 2022, the entire disclosures of which are incorporated herein by reference in their entireties.

FIELD OF THE INVENTION

The invention resides in the field of electric vehicle powertrain components, and more specifically with systems and methods of providing multi-speed transmissions that can meet the very different operational conditions that electric traction motors create.

INTRODUCTION

Electric traction motors have a very different torque output versus rotational speed (e.g., revolutions per minute "rpm") compared to piston engines. Unlike any type of piston engine, all electric motors have their maximum torque output from zero or near zero rpm up to about the first quarter to a third of their total rpm range. From that rpm point on, most electric motors transition from a constant or near constant torque output to a constant power output. Piston engines in contrast, have a near zero torque output starting at near zero rpm, which increases with rpm to somewhere around the 2/3 region of the piston engine's total rpm range. Peak power also occurs around this 2/3 rpm region. This difference in operational behavior continues with the usable rpm of an electric motor when compared to a piston engine.

With a 2,500 rpm medium or heavy duty commercial diesel engine, the first 500 rpm is used to just sit at idle. At this rpm, the diesel engine is just capable of providing power sufficient for the base parasitic loads such as engine friction, lights, cooling fans, power steering pump and maybe air conditioning. The next 500 rpm is also insufficient for any acceleration loads, due to the relatively small power production. To get into the more powerful rpm range of the diesel engine is what drives the presence of multi-speed transmissions. At around 1,000 rpm, this diesel engine can provide sufficient power to be able to propel the vehicle under both light to modest to heavy acceleration rates. All of this acceleration stops though as soon as the roughly 2,500 rpm maximum limit is reached, which now requires a different ratio in the transmission. In this example, a 2,500 rpm diesel really only has an approximate 1,500 of useful rpm.

In comparison, a 2,500 rpm electric motor has a 2,500 useful rpm range. At this time, even the very large, slow turning electric traction motors being used for heavy commercial trucks in the 250-350 kW power range have a useful 3,500 rpm range. The next smaller sizes group of electric motors, in the 150 to 200 kW power range, have a 5,000 to 6,000 useful rpm range. Followed by 9,000 rpm electric motors that can still generate 100-120 kW continuous power output for lighter vehicles such as airport shuttle buses and inner city delivery trucks. In the very light passenger vehicle world, 10,000 to 15,000 rpm electric motors are common.

For all of these new applications of electric motors providing the driving force into the driveshaft, the "excess" rpm of the electric motor needs to be reduced in order to match the normal maximum rpm of the driveshaft for that particular vehicle. For heavier commercial vehicles, a current production automatic, manual or automated manual, multi-speed transmission is typically used with these "low" rpm (3,000-4,000), high torque electric motors. In the vast majority of the conversions from diesel power to electric power, the multi-speed transmission designed to work with the diesel engine is retained and the diesel engine is simply replaced by the large, high torque electric motor.

There are many design decisions that are required in multi-speed transmissions that allow for that transmission to best accept the input torque and speeds and convert that into the required output torque and speeds. Many of these standard transmission design options and design practices are in profound conflict when the higher rpm nature of electric motors is inserted into the equation. Some challenges with providing gearing solutions for electric motor powered commercial vehicles revolve around the need for aggressive reduction ratios in order to climb hills with heavy loads and the negative consequences of high gear velocities, in particular the pitch line velocity of the gear sets within the multi-speed transmission.

Competition among commercial vehicle manufacturers have dramatically increased the service life of their vehicles, starting with increased service life of the drive line components that go into the vehicle. For long haul, Class 8 tractor-trailers, one million mile service life is becoming the standard for almost every manufacturer. Lighter commercial vehicles are at 300,000 to 500,000 thousand mile service lives. For electric vehicle transmissions to meet this expected service life, it is beneficial to control the pitch line velocities of the gearing. As the pitch line velocity increases, there is an aggressive corresponding increase in gear tooth wear. One driver in increasing, or decreasing, the pitch line velocity is the offset distance between internal rotating shafts or gear clusters. Reducing the offset distance, and therefore the radius of both interacting gears, the pitch line velocity is reduced in a linear fashion defined by the equation of v=wr, or velocity equals (angular rotation)×(gear radius) at the theoretical line of contact (e.g., the pitch line).

The multi-speed transmission design conflicts begin with the need to generate large reduction ratios from the multi-speed transmission using an electric motor that typically has twice the rpm capability compared to the piston engine that it replaces. In a manual or automated manual transmission, the problem begins with the input gear set, frequently referred to as the headset. In an automatic planetary transmission, the problem starts with a similar planetary relationship between sun, planets and ring. The headset gears begin the rpm reduction as well as transfers rotation power to a cluster shaft, which can now feed power to the other gear ratios. A headset gear typically has a reduction ratio in the range of 1.4 to 1.8. If an electric motor spins up to 5,000 rpm, this would be approximately twice the maximum rpm for the driveshaft of a commercial vehicle. Therefore, in order to be able to use the full rpm range of the electric motor, an additional 2:1 reduction would be needed in the commercial vehicle transmission. This additional reduction would be valuable and needed for each lower gear ratio in order to provide increasing amounts of torque, at lower and lower driveshaft rpms, to the driveshaft. Increasing the ratio of the headset by another 2:1 ratio generates a durability problem with either of the two possible design changes that are typically used to increase the overall rate of reduction.

The ratio of a gear set can be precisely characterized by the tooth ratio of the two gears. The ratio of a gear set can be generally characterized by the ratio of the gear diameters, a nominal 1.5 ratio times a 2:1 increase in the headset means that the diameter ratio would need to be in the 3 to 1 range. By keeping a "smaller" offset ratio, the pitch line velocity is controlled, but the small diameter of the driving pinion gear forces the tooth count to be aggressively reduced. The end result is that the pinion gear teeth are now subjected to a much higher frequency of contact, resulting in accelerated wear. If the alternative approach is taken that starts with the requirement to keep "a reasonable" tooth count on the pinion, it means the diameter of the driven gear is increased, thereby resulting in the offset distance also increasing. Using this approach to increase the overall rpm reduction of the electric motor, it now increases the pitch line velocity due to the radius (diameter) increase of all gear sets.

This disclosure describes a different approach to reducing electric motor rpm and providing for aggressive gear reduction ratios while reducing the basic design problems of reducing tooth count of pinion gear teeth or increasing an offset distance described above. Instead of changing the offset distance of headset gears, or excessively reducing a diameter of the drive pinion gear of the headset, an additional and separate reducer assembly is added prior to connection to the driveshaft. This configuration allows the design of an inner core of the multi-speed transmission to focus on controlling the pitch line velocity at each gearset as the priority. The total aggressive reduction, 3:1 in the example from above, can be accomplished in the separate reducer assembly. The reducer assembly can be placed before the multi-speed transmission input, after the multi-speed transmission output, or somewhere in between those two locations. In an aspect, this reducer assembly location is after the multi-speed transmission output because this will reduce the amount of torque that any one transmission gearset would need to transmit. This configuration also allows plenty of space for the reducer assembly to grow in length in order to reliably handle the full torque that the previous gearing can deliver. For many high torque electric traction motors, with output torque well in excess of 2,000 Nm, in conjunction with an aggressive internal first gear ratio, the reducer assembly may even include adjacent idler gears. Two idler gears will reduce the pressure load on the gear teeth which are driving the final torque amplification going into the driveshaft connection in half.

In an aspect, the technology relates to a powertrain system for a commercial electric vehicle including: an electric motor; a multi-speed transmission including: a drive shaft configured to rotate via the electric motor around a first axis; a main shaft co-axial with the drive shaft and having a first end and a second end; at least two selectable output ratios supported by at least one of the main shaft and the input shaft; at least one sliding dog clutch supported on the main shaft and configured to selectively engage a gear of the at least two selectable output ratios; and a cluster shaft meshed with the at least two selectable output ratios, wherein the cluster shaft is configured to rotate around a second axis that is offset from the first axis, and wherein based on a position of the at least one sliding dog clutch, rotation of the drive shaft is transmitted through the cluster shaft and into rotation of the main shaft; and a reducer assembly configured to receive the second end of the main shaft, the reducer assembly including: a reducer pinion supported proximate the second end of the main shaft; and an output shaft drivingly engaged with the reducer pinion, wherein the output shaft is configured to rotate around a third axis that is offset from the first axis and couple to a drive line of the commercial electric vehicle, and wherein the reducer assembly changes rotational speed of the main shaft prior to reaching the drive line.

In an example, the reducer assembly decreases rotational speed of the main shaft prior to reaching the drive line. In another example, the at least two selectable output ratios include a first helix gear and the reducer pinion is a second helix gear, the first helix gear having an opposite angle direction relative to the second helix gear. In yet another example, the main shaft and the output shaft are rotatably supported within the reducer assembly by thrust bearings. In still another example, the drive shaft and the cluster shaft are rotatably supported within the multi-speed transmission by radial bearings. In an example, the cluster shaft and the output shaft are co-axial.

In another example, the at least one sliding dog clutch has a plurality of axially extending projections, each projection having opposing radial sidewalls that taper in an axial direction. In yet another example, the reducer assembly further includes a pair of idler gears coupled between the reducer pinion and the output shaft. In still another example, the main shaft is a split shaft with a first shaft having a reduced diameter relative to a second shaft, the second shaft extending into the reducer assembly. In an example, the output shaft has a greater diameter than the main shaft. In another example, the multi-speed transmission includes a main case housing and the reducer assembly includes a reducer case housing coupled to the main case housing, and the main shaft extends between the main case housing and the reducer case housing.

In another aspect, the technology relates to a commercial electric vehicle including: a drive line; an electric motor configured to provide rotational power to the drive line; a multi-speed transmission disposed between the electric motor and the drive line, the multi-speed transmission including: a first rotational axis whereby a drive shaft, a main shaft, at least two selectable output ratios, and at least one sliding dog clutch are rotatable around the first rotational axis; and a second rotational axis offset from the first rotational axis whereby a cluster shaft is rotatable around the second rotational axis, the cluster shaft meshed with the at least two selectable output ratios; and a reducer assembly disposed between the electric motor and the drive line, the reducer assembly including a reduction gearset with an input shaft drivingly coupled to an output shaft, wherein the reduction gearset changes rotational speed of the output shaft relative to the input shaft, and wherein the reducer assembly is positioned between one of: the electric motor and the multi-speed transmission such that the drive shaft of the multi-speed transmission is coupled to the output shaft of the reducer assembly to drive rotation thereof, or the multi-speed transmission and the drive line such that the main shaft of the multi-speed transmission is coupled to the input shaft of the reducer assembly to drive rotation thereof.

In an example, the reduction gearset decreases rotation speed of the output shaft relative to the input shaft in the reducer assembly. In another example, the reducer assembly is positioned between the multi-speed transmission and the drive line and the input shaft is of unitary construction with the main shaft. In yet another example, the at least two selectable output ratios include a first helix gear and the input shaft has a second helix gear, the first helix gear having an opposite angle direction relative to the second helix gear. In still another example, the reducer assembly further includes a reducer case housing coupled to the multi-speed transmission, the input shaft and the output shaft are rotatably supported within the reducer case housing by thrust bearings. In an example, the multi-speed transmission further includes a main case housing, the drive shaft and the cluster shaft are rotatably supported within the main case housing by radial bearings.

In another example, the cluster shaft and the output shaft are co-axial along the second rotational axis. In yet another example, the at least one sliding dog clutch has a plurality of axially extending projections, each projection having opposing radial sidewalls that taper in an axial direction. In still another example, the reducer assembly further includes a pair of idler gears coupled between the input shaft and the output shaft. In an example, the multi-speed transmission is coupled in fluid communication with the reducer assembly.

In another example, the technology relates to a method of assembling a powertrain system for a commercial electric vehicle, the method including: providing an electric motor; providing a drive line configured to be operationally driven by the electric motor; joining a reducer assembly to a multi-speed transmission, the multi-speed transmission including a drive shaft rotatable around a first axis, a main shaft co-axial with the drive shaft and having a first end and a second end, at least two selectable output ratios supported by at least one of the main shaft and the drive shaft, at least one sliding dog clutch supported on the main shaft and configured to selectively engage a gear of the at least two selectable output ratios, and a cluster shaft meshed with the at least two selectable output ratios, wherein the cluster shaft is rotatable around a second axis that is offset from the first axis, and based on a position of the at least one sliding dog clutch, rotation of the drive shaft is transmitted through the cluster shaft and into rotation of the main shaft, the reducer assembly receiving the second end of the main shaft and including a reducer pinion supported proximate the second end of the main shaft, and an output shaft drivingly engaged with the reducer pinion, wherein the output shaft is configured to rotate around a third axis that is offset from the first axis and couple to the drive line; and coupling the reducer assembly and the multi-speed transmission between the electric motor and the drive line, wherein the reducer assembly configured to change rotational speed of the main shaft prior to reaching the drive line.

In an example, joining the reducer assembly to the multi-speed transmission includes orienting the reducer pinion having a first helix gear at an opposite angle direction relative to a second helix gear of the at least two selectable output ratios. In another example, joining the reducer assembly to the multi-speed transmission includes co-axially aligning the cluster shaft and the output shaft. In yet another example, joining the reducer assembly to the multi-speed transmission includes coupling a pair of idler gears between the reducer pinion and the output shaft.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

This disclosure describes examples of a powertrain system for use with commercial electric vehicles. The powertrain system includes a reducer assembly that is configured to reduce rotational speed generated from an electric motor prior to reaching a drive line and the components therein. By using the reducer assembly, the durability and efficiencies of a multi-speed transmission can be retained with regards to gear teeth configuration and pitch line velocity. The reducer assembly can be placed before the multi-speed transmission input, after the multi-speed transmission output, or somewhere in between those two locations. In an aspect, the reducer assembly is positioned after the multi-speed transmission output because this will reduce the amount of torque that any one transmission gearset would need to transmit. This configuration also allows plenty of space for the reducer assembly to grow in length in order to reliably handle the full torque that the previous gearing can deliver.

The reducer assembly includes a reducer pinion supported on a main shaft of the multi-speed transmission and an output shaft that is meshed therewith. The reducer assembly may even include adjacent idler gears. Two idler gears will reduce the pressure load on the gear teeth which are driving the final torque amplification going into the drive line. As such, the reducer assembly is a fixed ratio gear reducer that is disposed between the electric motor and the drive line to reduce the rpm's generated by the electric motor. Additionally, the reducer assembly can provide an equivalent increase in the torque that can be applied to the drive line as the delivered rpm is reduced through gearing. The reducer assembly as described herein operates in all of the different gears of the multi-speed transmission without any modifications or control adjustments.

Throughout this description, references to orientation (e.g., front(ward), rear(ward), top, bottom, back, right, left, upper, lower, etc.) of the components of the powertrain system relate to their position when installed on a commercial electric vehicle and are used for ease of description and illustration only. No restriction is intended by use of the terms regardless of how the components of the powertrains system are situated on its own. As used herein, the terms "axial" and "longitudinal" refer to directions and orientations, which extend substantially parallel to a centerline of the component or system. Moreover, the terms "radial" and "radially" refer to directions and orientations, which extend substantially perpendicular to the centerline of the component or system. In addition, as used herein, the term "circumferential" and "circumferentially" refer to directions and orientations, which extend arcuately about the centerline of the component or system.

Figure 1:
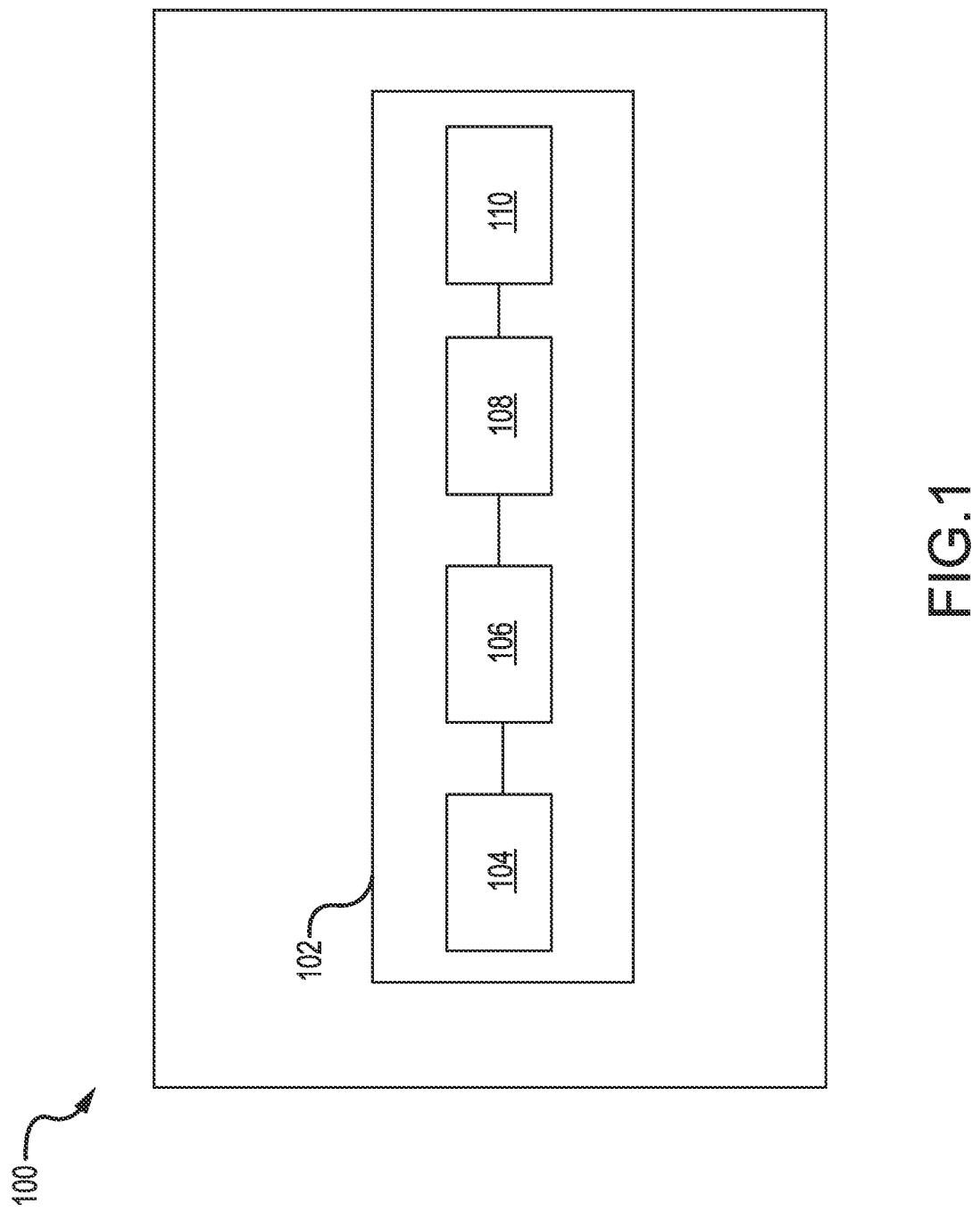
FIG. 1 is a schematic view an exemplary commercial electric vehicle.

FIG. 1 is a schematic view an exemplary commercial electric vehicle 100. In the example, the commercial electric vehicle 100 may be designed for on-highway or off-highway operation. Examples of off-highway commercial electric vehicles 100 can include tracked or wheeled military vehicles, sod cutters, roadside mowers, forestry equipment, as well as above ground and below ground mining. On-highway commercial vehicles 100 may be as light as postal delivery vehicles at 1,820 kg (4,000 lb) GVWR to multi-drive axle and multi-steering axle heavy haul trucks at 55,000 kg (121,000 lb) GVWR.

The commercial electric vehicle 100 includes a powertrain system 102 that is configured to transform energy into propulsion motion. The powertrain system 102 includes an electric motor 104, a multi-speed transmission 106, a reducer assembly 108, and a drive line 110. The electric motor 104 is configured to convert electrical energy into mechanical energy, and in the example, produce a rotary speed (e.g., rpm) and force (e.g., torque) for the powertrain system 102. In an aspect, the electric motor 104 may be a high speed and/or a high torque electric motor. In an example, the electric motor 104 may have a power range between 150-350 kW that has a 3,000-6,000 useful rpm range. The electric motor 104 is operationally coupled with the multi-speed transmission 106 that connects the electric motor 104 to the drive line 110. The multi-speed transmission 106 includes at least two selectable output ratios and is configured to increase efficient operation of the electric motor 104 by selectively changing gears for different torque-speed demands of the commercial electric vehicle 100 so as to increase vehicle performance and reduced energy consumption. The drive line 110 is configured to receive the rotary force generated from the electric motor 104 and the multi-speed transmission 106 to propel motion of the vehicle. In examples, the drive line 110 may include one or more axles, driveshaft, wheels, differentials, joints, etc.

In the example, the powertrain system 102 also includes the reducer assembly 108 that is configured to reduce the rotary speed generated from the electric motor 104 prior to reaching the drive line 110. In an aspect, the reducer assembly 108 is disposed between the multi-speed transmission 106 and the drive line 110 such that the output from the multi-speed transmission 106 is directly coupled to the input for the reducer assembly 108, while the output from the reducer assembly 108 is the drive for the drive line 110. In this aspect, torque within the multi-speed transmission 106 is reduced. However, in other aspects, the reducer assembly 108 may be disposed between the electric motor 104 and the multi-speed transmission 106 as required or desired. In this example, the output from the electric motor 104 is directly coupled to the input for the reducer assembly 108, while the output from the reducer assembly 108 is the input for the multi-speed transmission 106. Examples of the multi-speed transmission 106 and the reducer assembly 108 are described further below in reference to FIGS. 2-8.

In the examples described herein, the electric motor 104, the multi-speed transmission 106, and the reducer assembly 108 as having their own cases. In other examples, the electric motor 104, the multi-speed transmission 106, and/or the reducer assembly 108 may be integrated into a common case for efficiency and/or performance. For example, the motor and gearbox case could be a single structure with end cover pieces or a multi-section case, bolted together, with or without one or two end cover pieces. As such, a motor shaft may be integrated into the multi-speed transmission as the input with at least a portion of a cluster shaft also being at least partially within the electric motor section.

Figure 2:
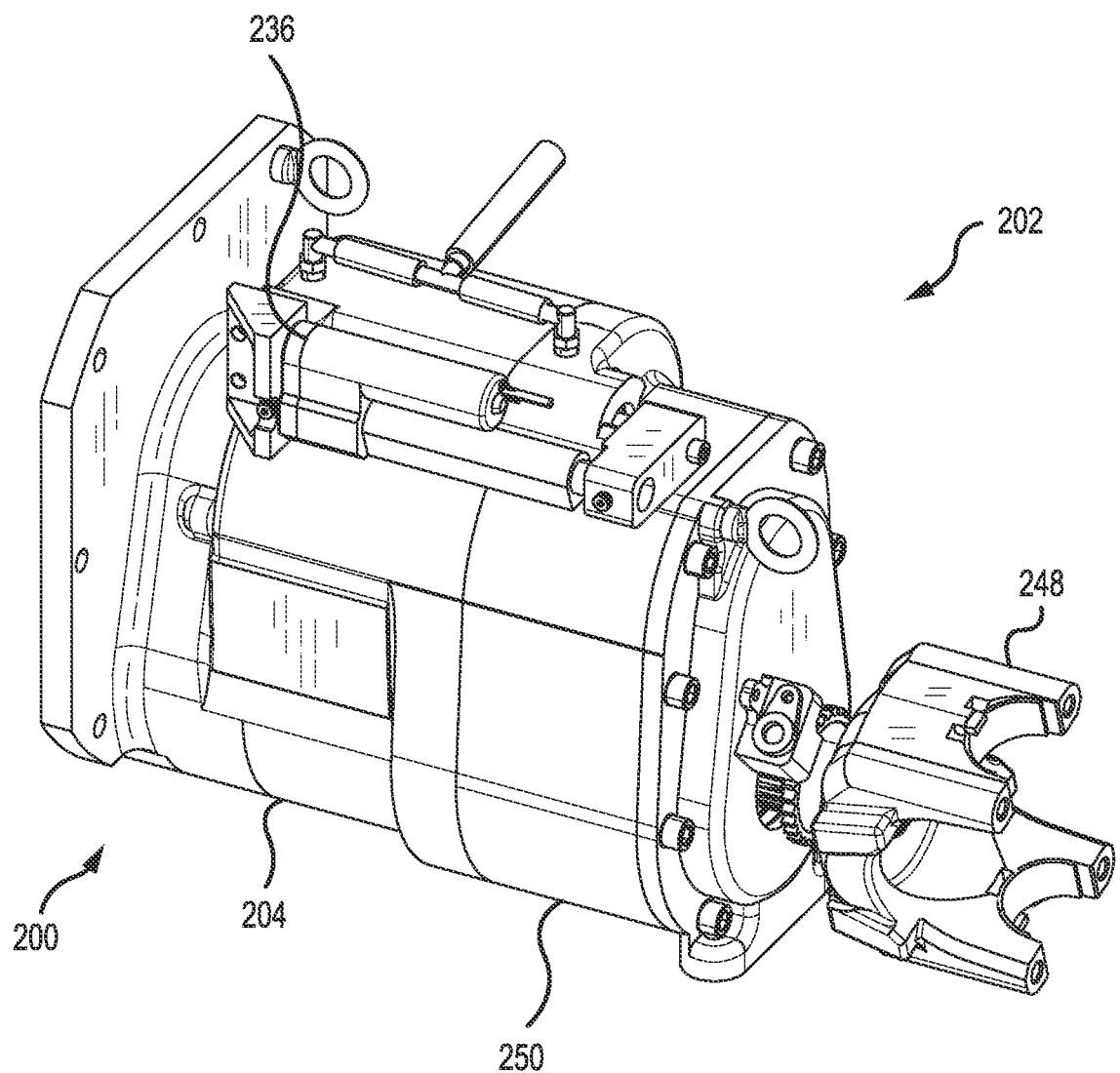
FIG. 2 is a perspective view of a multi-speed transmission and a reducer assembly for use with the commercial electric vehicle shown in FIG. 1.
Figure 3:
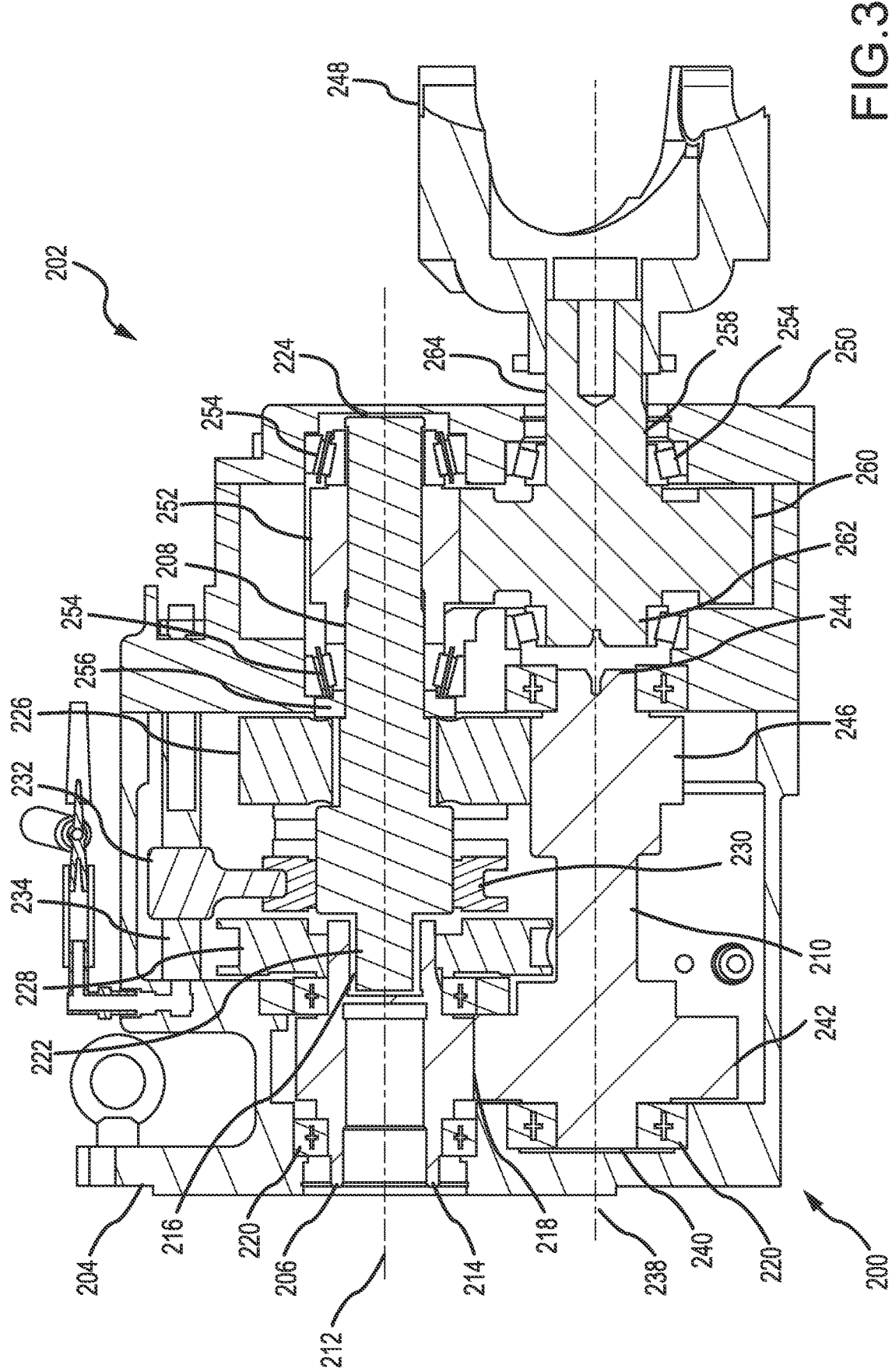
FIG. 3 is a cross-sectional view of the multi-speed transmission and the reducer assembly shown in FIG. 2.

FIG. 2 is a perspective view of an exemplary multi-speed transmission 200 and a reducer assembly 202 for use with the commercial electric vehicle 100 (shown in FIG. 1). FIG. 3 is a cross-sectional view of the multi-speed transmission 200 and the reducer assembly 202. Referring concurrently to FIGS. 2 and 3, the multi-speed transmission 200 includes two or more selectable output ratios. The multi-speed transmission 200 includes a main case housing 204 that rotatably supports a drive shaft 206 (also known as an input shaft), a main shaft 208, and a cluster shaft 210. The drive shaft 206 defines a first rotational axis 212 and has a first end 214 configured to couple to the electric motor 104 (shown in FIG. 1) so that the electric motor 104 drives rotation of the drive shaft 206 around the first rotational axis 212. The drive shaft 206 also includes a second end 216. The drive shaft 206 has a headset gear 218 (e.g., a second gear) so that the drive shaft 206 is meshed with the cluster shaft 210. In the example, the drive shaft 206 is rotatably supported by a pair of bearings 220. The bearings 220 may be a radial bearing for supporting a radial load and may be a ball or roller type bearing.

The main shaft 208 is co-axial with the drive shaft 206 and is rotatable around the first rotational axis 212. The main shaft 208 includes a first end 222. In the example, the first end 222 of the main shaft 208 is not coupled to the second end 216 of the drive shaft 206 such that the main shaft 208 and the drive shaft 206 are independent from one another. A second end 224 of the main shaft 208 extends into the reducer assembly 202. The multi-speed transmission 200 has two or more selectable output ratios and includes a first gear 226 and a face plate 228. The first gear 226 is supported on the main shaft 208. The multi-speed transmission 200 also has a means to lock the drive shaft 206 to the main shaft 208, using a moveable sliding dog clutch 230 and the face plate 228. The sliding dog clutch 230 is rotationally locked with the main shaft 208 but able to move axially along the main shaft 208, between first gear 226 and the face plate 228. The sliding dog clutch 230 has a mechanical means to lock either the first gear 226 to be rotationally locked with the main shaft 208 or lock the face plate 228, and thereby the drive shaft 206 and the headset gear 218, to be rotationally locked with the main shaft 208. As such, the multi-speed transmission 200 includes selectable output ratios.

In multi-speed transmissions 106 (shown in FIG. 1) without a reducer assembly 108 positioned between the multi-speed transmission 106 and the drive line 110, locking the face plate 228 to the main shaft 208 results in an effective ratio of 1:1 into the drive line 110. If the reducer assembly 108 is present between the multi-speed transmission 106 and drive line 110, then the effective ratio going into the drive line 110 is the 1:1 of the multi-speed transmission 106 of this example multiplied by the reducer assembly 108 ratio (R:1), where 'R' equals the reduction ratio or the rpm increasing ratio of the reducer assembly 108.

The sliding dog clutch 230 is axially coupled to a shift fork 232, but is not rotationally coupled. The shift fork 232 is locked to a moveable shift rail 234 that is rigidly connected to an actuator 236. The actuator 236 is configured to selectively slide the dog clutch 230 axially along the first rotational axis 212 via the shift rail 234 and the shift fork 232. In an example, the actuator 236 may be a push-pull type actuator.

The cluster shaft 210 is rotatably supported at least partially within the main case housing 204 with bearings 220. The cluster shaft 210 defines a second rotational axis 238 that is parallel to and offset from the first rotational axis 212. The cluster shaft 210 includes a first end 240 having a headset gear 242 that meshes with the drive shaft 206 and an opposite second end 244 with a gear 246 that meshes with the first gear 226. The gears 242, 246 are rigidly fixed to the cluster shaft 210.

In operation, the multi-speed transmission is a constant mesh gearbox with helical gears for power transmission. The electric motor 104 drives rotation of the drive shaft 206 which also drives rotation of cluster shaft 210 via the headset gears 218, 242. When the sliding dog clutch 230 is not engaged, the gear 226 and the face plate 228 can rotate freely without engaging with the main shaft 208, and thus, not transmit power to the main shaft 208. However, to transfer power from the drive shaft 206 to the main shaft 208 via rotational speed (e.g., rpm's), the sliding dog clutch 230 engages with either gear 226 or face plate 228 so that the cluster shaft 210 can drive rotation of the main shaft 208 and power from the cluster shaft 210 is transmitted to the main shaft 208 because the gears in both shafts 208, 210 are always meshed together.

In the example, the second rotational axis 238 and the first rotational axis 212 are offset by about 105 mm so that the headset gears 218, 242 have a reduction ration between about 1.4-1.8. This configuration enables for the pitch line velocity of the helical gears to be reduced so that wear is decreased and service life is increased for the multi-speed transmission 200. As described above, however, it is desirable to still reduce the speed of the electric motor 104 prior to reaching the drive line 110 (shown in FIG. 1) even while maintaining the performance benefits of the configuration of the multi-speed transmission 200. As such, the reducer assembly 202 is operationally coupled to the main shaft 208 and includes a reduction gear set so as to reduce the speed of the main shaft 208 prior to being transferred to an end yoke 248 of the drive line 110.

As described herein, commercial electric vehicles typically use the reducer assembly 202 to reduce rpms, and thus, maintain or increase torque being transferred to the drive line. In other examples, such as, but not limited to, electric racing vehicles, rpms may be desired to be increased. As such, alternatively the reducer assembly 202 may include a gear set that is a rpm increasing gear ratio depending on the configuration and requirements of the drive line.

The reducer assembly 202 includes a reducer case housing 250 coupled to the main case housing 204 of the multi-speed transmission 200. In the example, the reducer case housing 250 may be bolted onto the main case housing 204 and both housings 250, 204 are in fluid communication with each other so that transmission fluid can flow therebetween and be used to protect the gearing therein. The bearing 220 for the second end 244 of the cluster shaft 210 may be supported by the reducer case housing 250. In other examples, the reducer case housing 250 and the main case housing 204 may be integral with one another. In still other examples, the reducer case housing 250 and the main case housing 204 may be fluidly isolated from each other as required or desired.

The second end 224 of the main shaft 208 extends from the main case housing 204 into the reducer case housing 250 and along the first rotational axis 212. A reducer pinion 252 is fixed to the second end 224 of the main shaft 208 and rotatable therewith. On either side of the reducer pinion 252 the main shaft 208 is supported by a pair of thrust bearings 254. The thrust bearings 254 may be a tapered roller thrust bearing so as to accommodate axial thrust, as well as radial loads, generated by the multi-speed transmission 200. A spacer 256 may be positioned between one of the thrust bearings 254 and the first gear 226 proximate a middle section of the main shaft 208. In the example, the spacer 256 may be positioned about an axial midpoint of the main shaft 208 so that approximately half of its axial length is within the main case housing 204 and the other half of it axial length is within the reducer case housing 250. By supporting the main shaft 208 between the first gear 226 and the reducer pinion 252, torque is more efficiently transferred from the multi-speed transmission 200 to the reducer assembly 202.

The main shaft 208 is simultaneously the output shaft of the multi-speed transmission 200 and the input shaft for the reducer assembly 202. As such, the output shaft of the multi-speed transmission 200 and the input shaft for the reducer assembly 202 rotate at the same rotational speed. In the example, the main shaft 208 is of unitary construction and acts as both the output shaft for the multi-speed transmission 200 and the input shaft to the reducer assembly 202. This unitary construction reduces wear on the main shaft 208 from the high loads that are transferred therethrough. In other examples, the main shaft 208 may be a split shaft and include two or more shaft components coupled together as required or desired.

The reduction gearset of the reducer assembly 202 also includes an output shaft 258 rotatably supported at least partially within the reducer case housing 250 by a pair of thrust bearings 254. The output shaft 258 has a gear 260 that drivingly engages with the reducer pinion 252 and is rotatable around the second rotational axis 238. In the example, the output shaft 258 is co-axial with the cluster shaft 210, but the output shaft 258 is discrete from the cluster shaft 210 and independently rotatable. By aligning the output shaft 258 on the second rotational axis 238, pitch line velocity of the reduction gearset is controlled similar to the multi-speed transmission 200 described above so as to decrease wear and increase reliability. In other examples, the output shaft 258 may rotate around an axis that is offset from the second rotational axis 238, either closer to or further away therefrom, so as to control the reduction ratio between the main shaft 208 and the end yoke 248 as required or desired.

The output shaft 258 has a first end 262 that includes the gear 260 and is disposed within the reducer case housing 250 and an opposite second end 264 that projects at least partially out of the reducer case housing 250 and attach to the end yoke 248. As such, the output shaft 258 drives rotation of the end yoke 248, and thereby, the drive line 110. In operation, the reduction gear set of the reducer assembly 202 decreases the rotational speed of the main shaft 208 from the multi-speed transmission 200 prior to reaching the end yoke 248 and the drive line 110. In some aspects, the reducer assembly 202 may increase the torque output from the multi-speed transmission 200 to the drive line 110. The reducer assembly 202 operates to change rotational speed of the main shaft 208 prior to transmission to the drive line 110 in any of the gears that the multi-speed transmission 200 is in without any additional control operations. As such, the reducer assembly 202 is automatically and always operable when the multi-speed transmission 200 is in use. In the example, the reducer assembly 202 operates to reduce the rotational speed of the main shaft 208 prior to transmission to the drive line. In other examples, the reducer assembly 202 may be operable to increase the rotational speed of the main shaft 208 prior to transmission to the drive line as required or desired.

In the example, the reducer pinion 252 and the gear 260 of the output shaft 258 are helical gears. As such, to oppose at least some of the operational forces generated by the helical gears of the multi-speed transmission 200, the helical gears of the reducer assembly 202 have an opposite angle direction relative to the helical gears of the multi-speed transmission 200. This configuration further reduces internal stresses within the powertrain system.

In an aspect, the diameter of the main shaft 208 at the second end 224 is about 40 mm while the diameter of the output shaft 258 is about 50 mm. As such, the output shaft 258 has a diameter that is greater than the main shaft 208. In examples, the diameter of the output shaft 258 is between 100%-155% greater than the main shaft 208. In an aspect, the diameter of the output shaft 258 is between 120%-150% greater than the main shaft 208. In another aspect, the diameter of the output shaft 258 is about 120% greater than the main shaft 208. Additionally or alternatively, the outer diameter of the gear 160 is about 152 mm, while the outer diameter of the reducer pinion 252 is about 72 mm. In examples, the reduction gearset reduces the speed of the main shaft 208 by about 50% prior to input to the drive line 110. For example, an electric motor 104 that is operating at 4,000 rpms, the reduction gearset will reduce the transmission to the drive line to 2,000 rpms at the output shaft 258. It should be appreciated that other reductions ratios may also be used by the reducer assembly 202 as required or desired. In another aspect, an axial length of the reduction gearset (e.g., the reducer pinion 252 and the gear 260) is axially longer than the first gear 226 of the multi-speed transmission 200.

Figure 4:
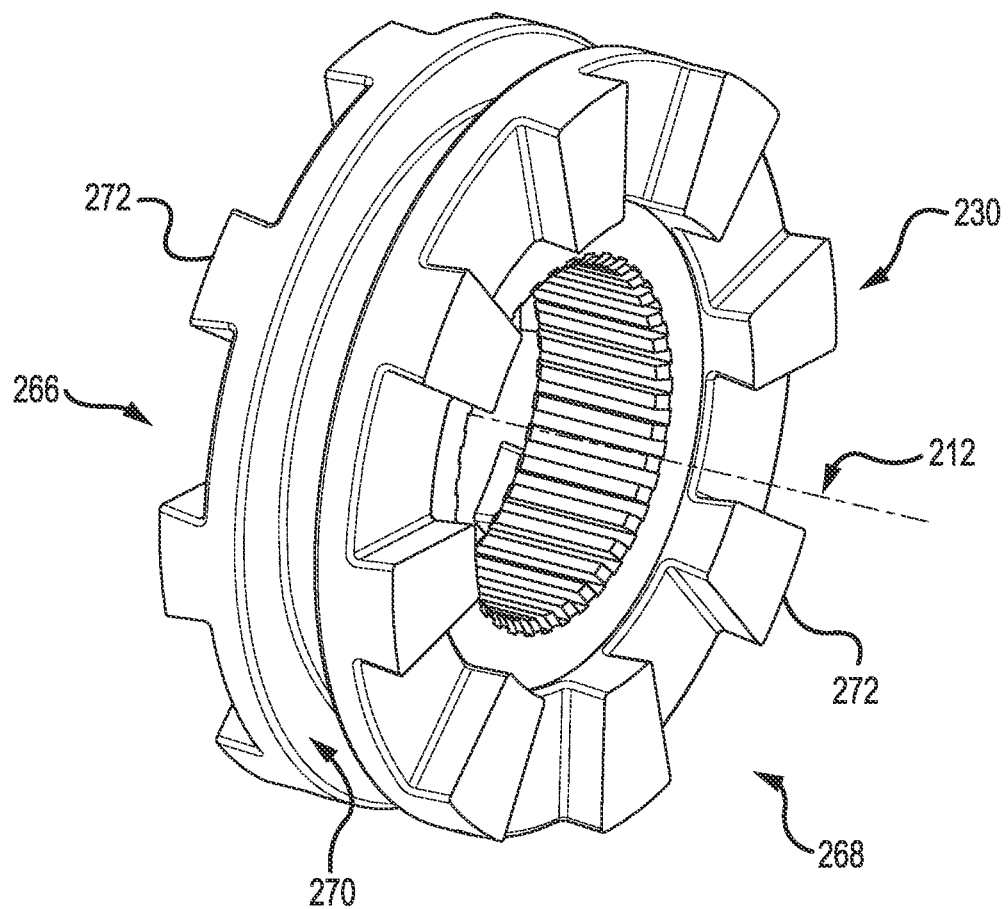
FIG. 4 is a perspective view of a sliding dog clutch for use with the multi-speed transmission shown in FIGS. 2 and 3.
Figure 5:
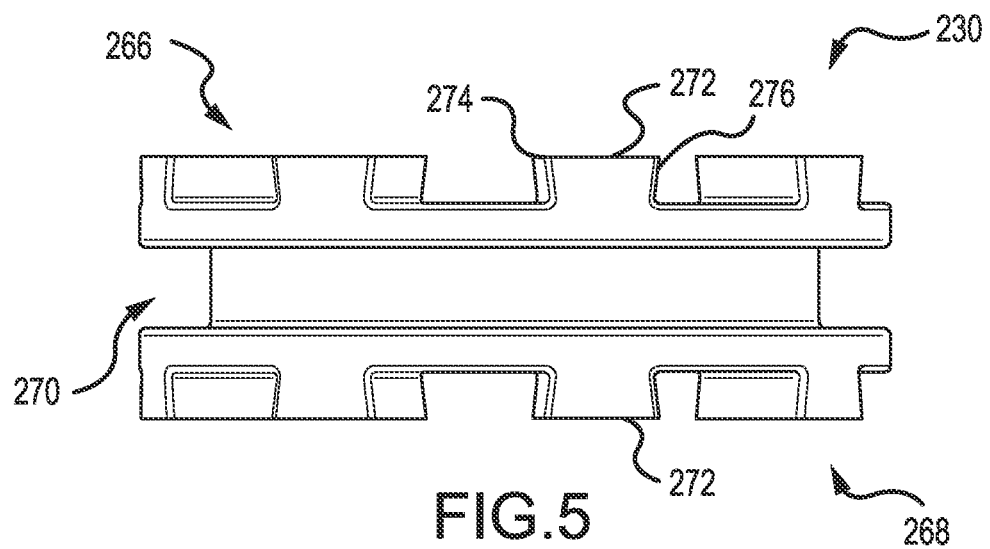
FIG. 5 is an end view of the sliding dog clutch shown in FIG. 4.

FIG. 4 is a perspective view of the sliding dog clutch 230 for use with the multi-speed transmission 200 (shown in FIGS. 2 and 3). FIG. 5 is an end view of the sliding dog clutch 230. Referring concurrently to FIGS. 4 and 5, the sliding dog clutch 230 couples to the main shaft 208 and between the gear 226 and the face plate 228 (shown in FIG. 3). The sliding dog clutch 230 rotates with the main shaft 208, but can selectively axially slide along the main shaft 208 and the first rotational axis 212. The sliding dog clutch 230 has a body with a first axial side 266 and an opposite second axial side 268. An annular channel 270 circumferentially extends around the body and between the axial sides 266, 268. The annular channel 270 is configured to receive at least a portion of the shift fork 232 (shown in FIG. 3) so that the dog clutch 230 is slidable relative to the main shaft 208.

Each axial side 266, 268 includes a plurality of axially extending projections 272 circumferentially spaced along an outer perimeter of the body of the sliding dog clutch 230. The projections 272 are configured to engage with a corresponding axial recess (not shown) within the gears and face plate of the multi-speed transmission 200. As such, when the sliding dog clutch 230 is actuated to engage a gear, the sliding dog clutch 230 axially moves into engagement with the gear via insertion of the projections 272 into the recesses so as to drive rotation of the main shaft 208. To increase engagement with the gear and reduce slipping of the gears, each projection 272 has opposing radial sidewalls 274, 276 that taper in the axial direction. The projection 272 has a distal end that is of greater length than a proximal end that projects from the sides 266, 268 so that the sidewalls 274, 276 taper inwardly towards each other at their bases. This tapered configuration of the projections 272 and identical tapered projections placed in the side of the gears and face plate (not shown), provide a benefit in keeping the sliding dog clutch 230 aggressively locked into the selected gear or face plate. Under high torsional loads, a square sided dog tooth can become worn on the sides, resulting in the gear or face plate slipping when subject to high torque loads. The side angle sidewalls 274, 276 of the dog tooth projection 272 generates a tangential component of the normal force generated by the torque load, which forces the sliding dog clutch 230 to increase engagement with the gear or face plate and reduce or prevent slipping therebetween.

Figure 6:
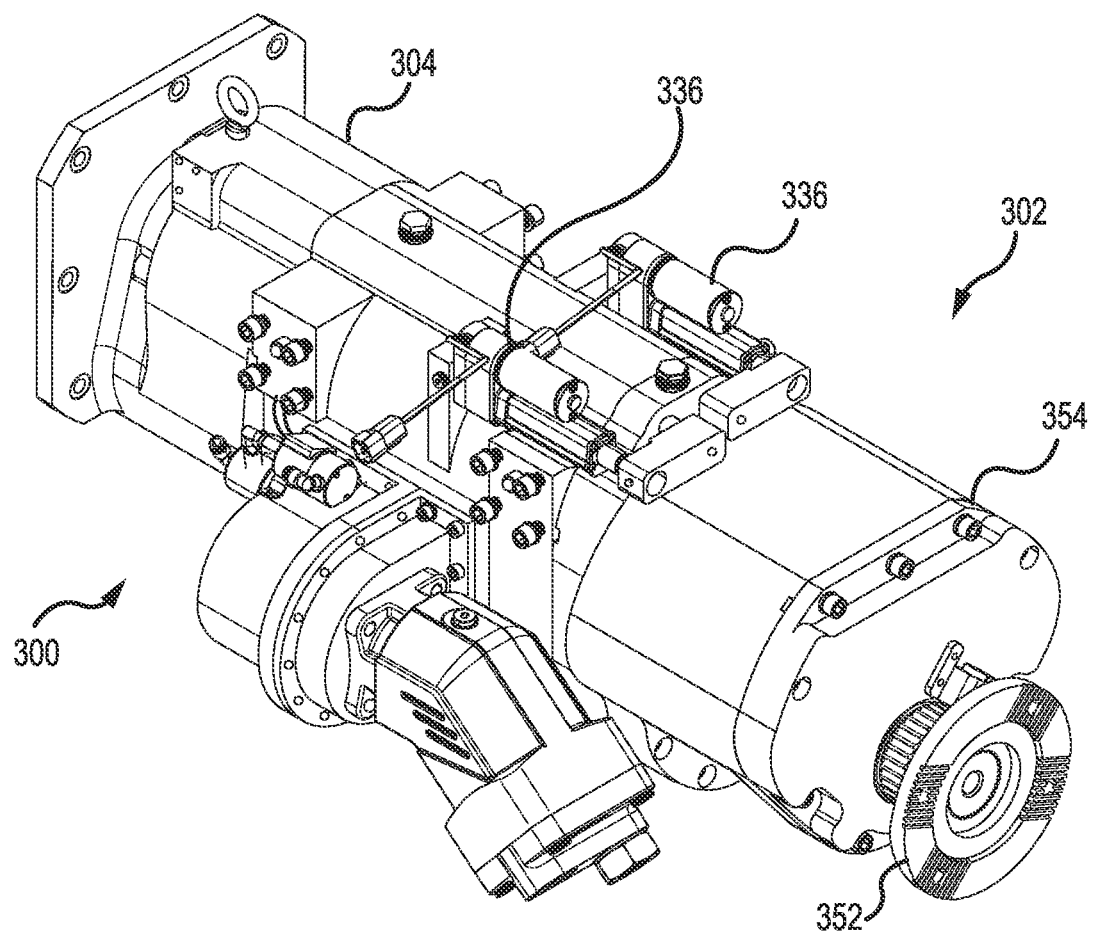
FIG. 6 is a perspective view of another multi-speed transmission and another reducer assembly for use with the commercial electric vehicle shown in FIG. 1.
Figure 7:
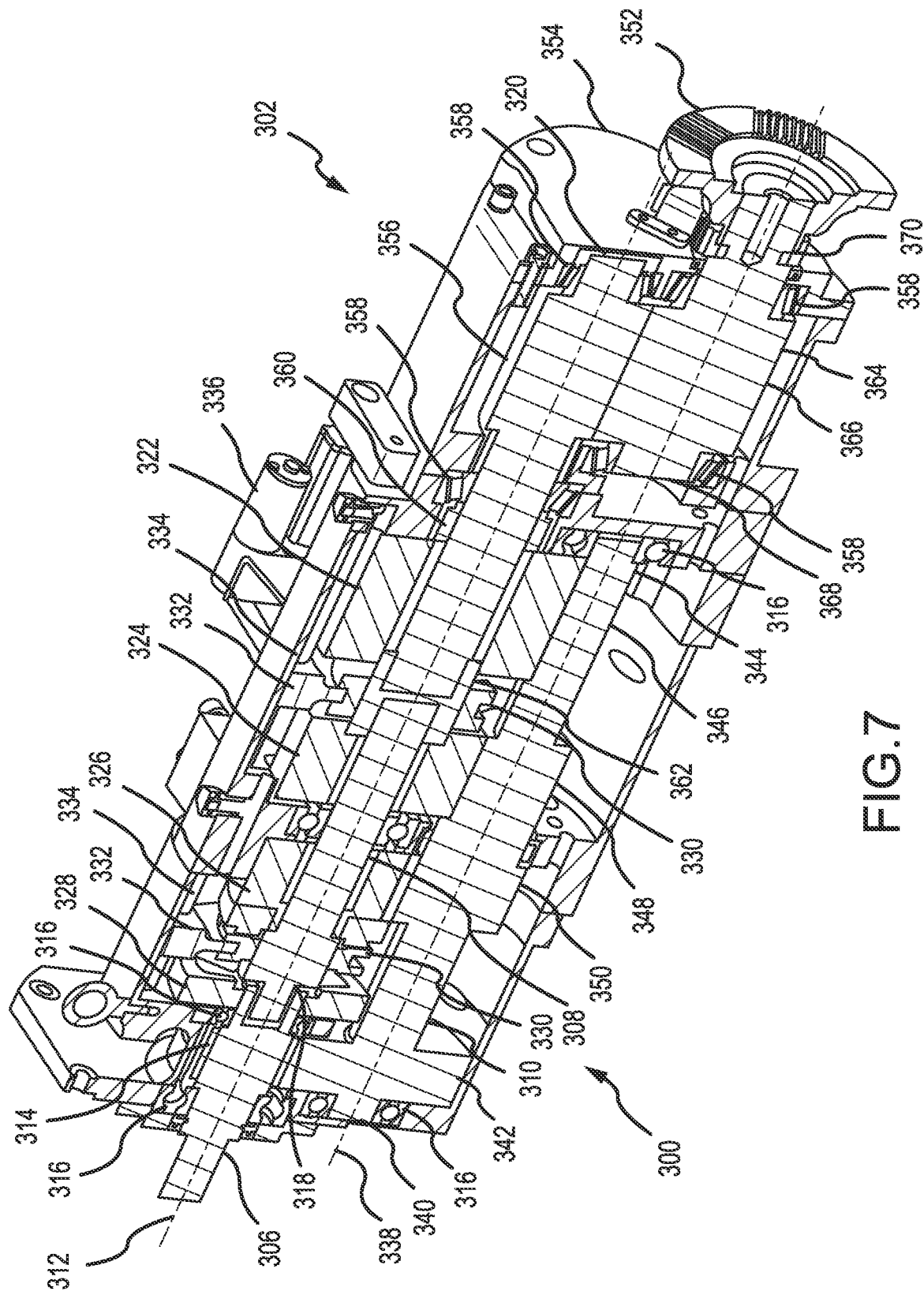
FIG. 7 is a perspective cross-sectional view of the multi-speed transmission and the reducer assembly shown in FIG. 6.

FIG. 6 is a perspective view of another multi-speed transmission 300 and another reducer assembly 302 for use with the commercial electric vehicle 100 (shown in FIG. 1). FIG. 7 is a perspective cross-sectional view of the multi-speed transmission 300 and the reducer assembly 302. Referring concurrently to FIGS. 6 and 7, and similar to the examples described above, the multi-speed transmission 300 has a plurality of selectable output ratios and includes a main case housing 304 that rotatably supports drive shaft 306, a main shaft 308, and a cluster shaft 310. The drive shaft 306 defines a first rotational axis 312 and has one end configured to couple to the electric motor 104 (shown in FIG. 1) so that the electric motor 104 drives rotation of the drive shaft 306 around the first rotational axis 312. The drive shaft 306 has a headset gear 314 (e.g., a fourth gear) so that the drive shaft 306 is meshed with the cluster shaft 310. In the example, the drive shaft 306 is rotatably supported by a pair of bearings 316. In an aspect, the bearings 316 are radial type bearings.

The main shaft 308 is co-axial with the drive shaft 306 and is rotatable around the first rotational axis 312, but discrete from the drive shaft 306. The main shaft 308 includes a first end 318 and an opposite second end 320 that extends into the reducer assembly 302. In this example, the multi-speed transmission 300 includes a first gear 322, a second gear 324, a third gear 326, and a fourth ratio generated by locking a sliding dog clutch 330 to a face plate 328 that is rigidly attached to the drive shaft 306. The first, second, and third gears 322, 324, 326 are supported on the main shaft 308 and free to rotate relative thereto. Two sliding dog clutches 330 are supported on the main shaft 308 and are configured to selectively engage one of the gears or face plate and so that one of the gears or face plate can selectively drive rotation of the main shaft 308 and the multi-speed transmission 300 includes selectable output ratios. Each sliding dog clutch 330 is coupled to a shift fork 332 that is engaged to a shift rail 334, and each shift fork 332 having an independent actuator 336. The actuator 336 is configured to selectively slide the dog clutch 330 axially along the first rotational axis 312 via the shift rail 334 and the shift fork 332. In the example, the sliding dog clutch 330 may include tapered projections as described above in reference to FIGS. 4 and 5.

The cluster shaft 310 is rotatably supported at least partially within the main case housing 304 with bearings 316. The cluster shaft 310 defines a second rotational axis 338 that is parallel to and offset from the first rotational axis 312. The cluster shaft 310 includes a first end 340 having a headset gear 342 that meshes with the drive shaft 306, an opposite second end 344, and three gears 346, 348, 350 meshed with the gears 322, 324, 326 supported on the main shaft 308.

In this example, the second rotational axis 338 and the first rotational axis 312 are offset by about 114 mm so that the headset gears 314, 342 have a reduction ration between about 1.4-1.8. This configuration enables for the pitch line velocity of the helical gears to be reduced so that wear is decreased and service life is increased for the multi-speed transmission 300. Additionally, the reducer assembly 302 is operationally coupled to the main shaft 308 and includes a reduction gear set so as to reduce the speed of the main shaft 308 prior to being transferred to a flange plate 352 of the drive line 110 (shown in FIG. 1).

The reducer assembly 302 includes a reducer case housing 354 coupled to the main case housing 304 of the multi-speed transmission 300. The second end 320 of the main shaft 308 extends from the main case housing 304 into the reducer case housing 354 and along the first rotational axis 312. A reducer pinion 356 is fixed to the second end 320 of the main shaft 308 and rotatable therewith. On either side of the reducer pinion 356 the main shaft 308 is supported by a pair of thrust bearings 358. A spacer 360 may be positioned between one of the thrust bearings 358 and the first gear 322 proximate a middle section of the main shaft 308. In this example, the main shaft 308 may be a split shaft because of the need for the main shaft 308, in the immediate vicinity of the first gear output ratio pair 322, 346, to have its cross-sectional area be increased in order to with stand the maximum motor torque multiplied by the headset gear ratio 314, 342, multiplied by the first gear ratio 322, 346. This section of the main shaft 308 further withstands the additional torque applied by the pinon gear 356 of the reducer assembly 302. The split shaft may include a first shaft having second and third gears 324, 326 and a second shaft having the first gear 322 and extending into the reducer assembly 302. In an aspect, the first shaft may have a reduced diameter relative to the second shaft. A spilt shaft coupling 362 may be positioned between the first gear 322 and the second gear 324 so that two main shaft components are coupled together.

The reduction gearset of the reducer assembly 302 also includes an output shaft 364 rotatably supported at least partially within the reducer case housing 354 by a pair of thrust bearings 358. The output shaft 364 has a gear 366 that drivingly engages with the reducer pinion 356 and is rotatable around the second rotational axis 338. In the example, the output shaft 364 is co-axial with the cluster shaft 310, but the output shaft 364 is discrete from the cluster shaft 310 and independently rotatable. By aligning the output shaft 364 on the second rotational axis 338, pitch line velocity of the reduction gearset is controlled similar to the multi-speed transmission 300 described above so as to decrease wear and increase reliability. The output shaft 364 has a first end 368 that includes the gear 366 and is disposed within the reducer case housing 354 and an opposite second end 370 that projects at least partially out of the reducer case housing 354 and attach to the flange plate 352 that is used to connect to the remaining drive line components. In the example, the reducer pinion 356 and the gear 366 of the output shaft 364 are helical gears that have an opposite angle direction relative to the helical gears of the multi-speed transmission 300.

In an aspect, the diameter of the main shaft 308 at the second end 320 is about 50 mm while the diameter of the output shaft 364 is about 77 mm. As such, the output shaft 364 has a diameter that is greater than the main shaft 308. In examples, the diameter of the output shaft 364 is between 100%-155% greater than the main shaft 308. In an aspect, the diameter of the output shaft 364 is between 120%-150% greater than the main shaft 308. In another aspect, the diameter of the output shaft 364 is about 150% greater than the main shaft 308. Additionally or alternatively, the outer diameter of the gear 366 is about 150 mm, while the outer diameter of the reducer pinion 356 is about 102 mm. In examples, the reduction gearset reduces the speed of the main shaft 208 by about 50% prior to input to the drive line 110. It should be appreciated that other reduction ratios may also be used by the reducer assembly 302 as required or desired.

In another aspect, an axial length of the reduction gearset (e.g., the reducer pinion 356 and the gear 366) is axially longer than the first gear 322 of the multi-speed transmission 300. In this example, to further distribute loads within the reduction gearset can further include a pair of idler gears 372 coupled between the reducer pinion 356 and the gear 366. The idler gears 372 are described further below in reference to FIG. 8.

Figure 8:
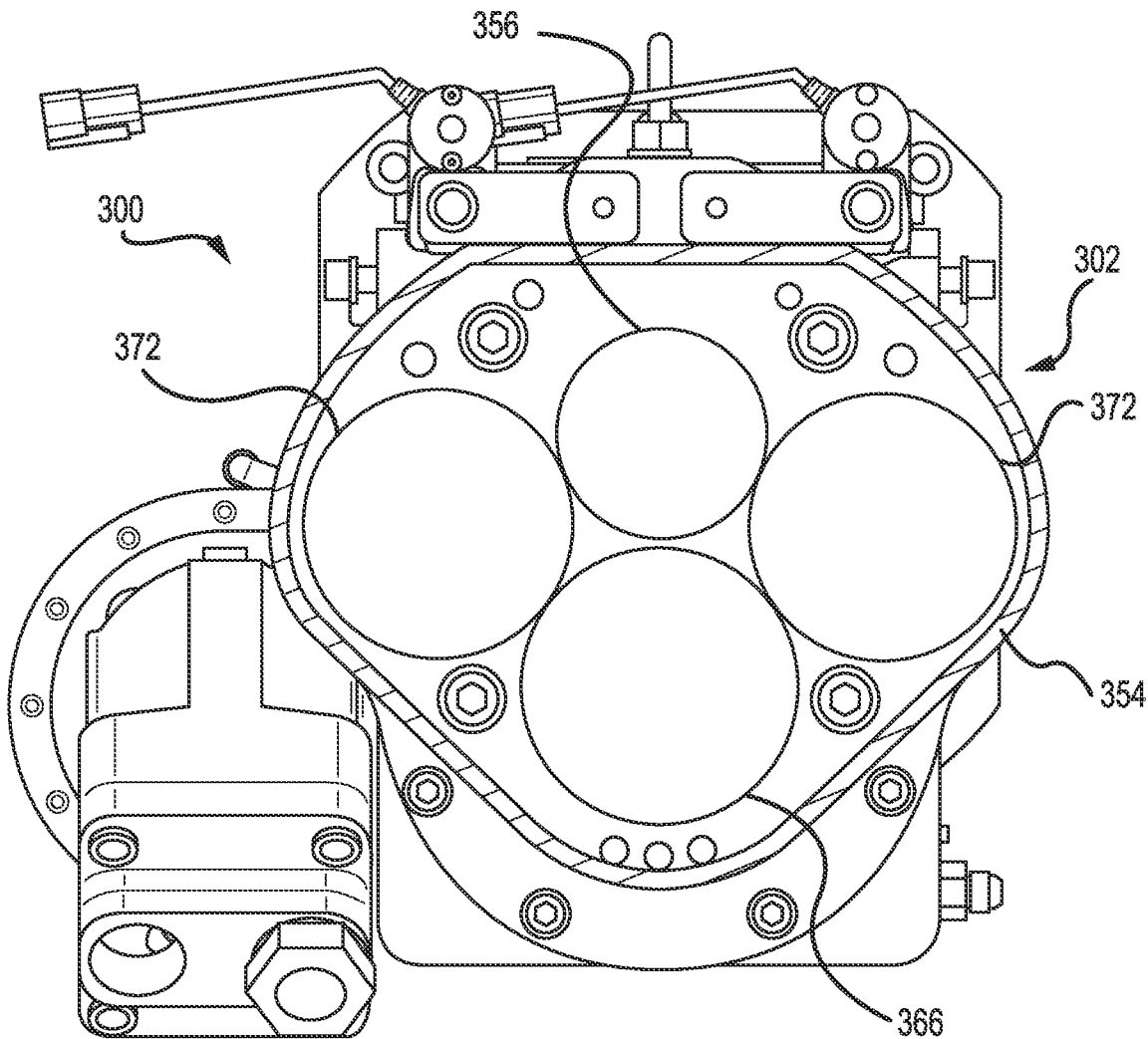
FIG. 8 is an axial cross-sectional view of the reducer assembly shown in FIG. 6.

FIG. 8 is an axial cross-sectional view of the reducer assembly 302 shown in FIG. 6. The reducer assembly 302 is positioned axially behind the multi-speed transmission 300. The reducer assembly 302 includes the reducer case housing 354 that houses the reducer pinion 356 and the output shaft gear 366. The reduction gearset also includes the pair of idler gears 372 that are configured to further distribute loads within the reduction gearset. The idler gears 372 are rotatably supported within the reducer case housing 354 and are positioned on the left and right sides of the reducer pinion 356 and the output shaft gear 366. The diameter of the idler gear 372 may be between the diameter sizes of the reducer pinion 356 and the output shaft gear 366.

Figure 9:
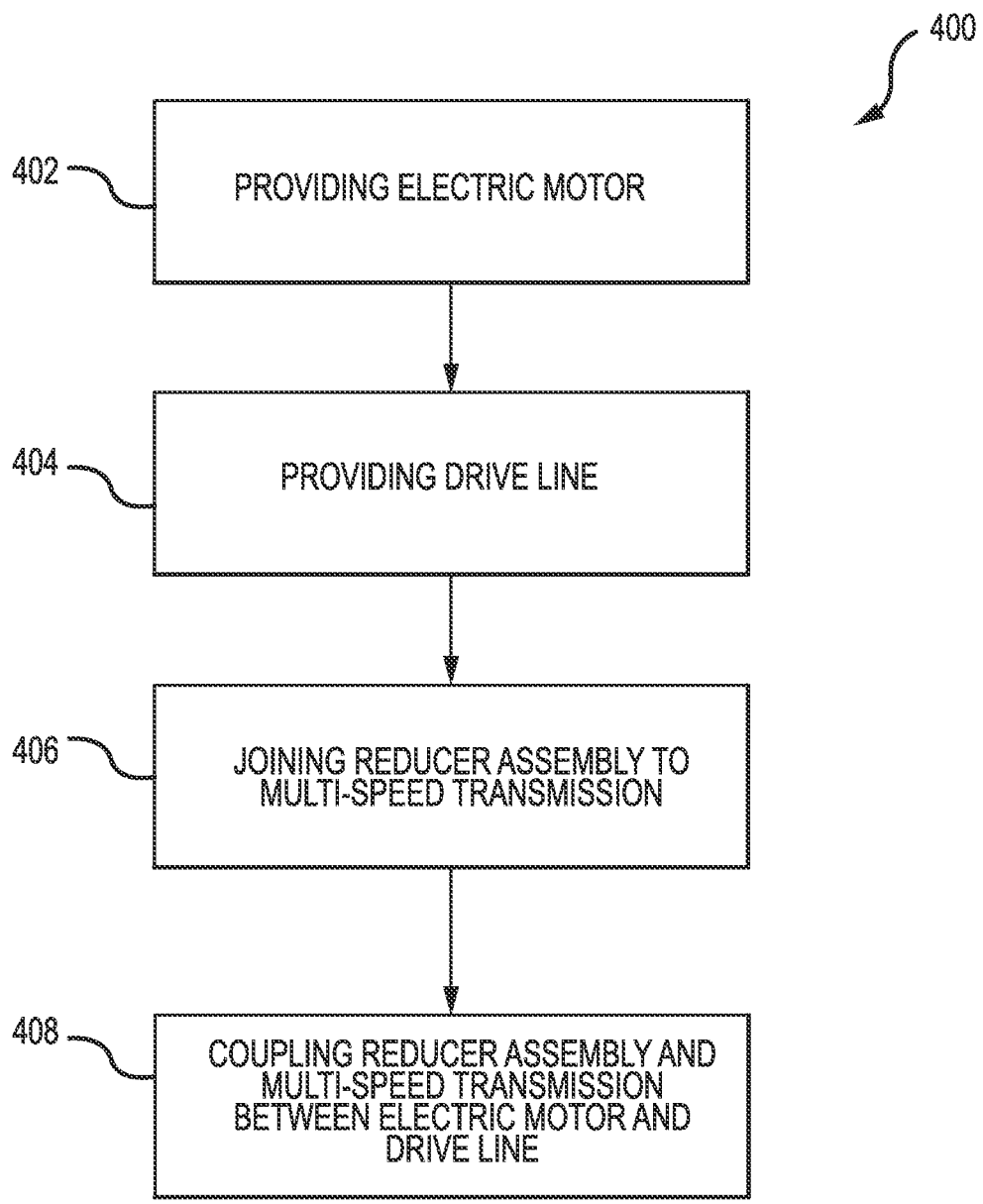
FIG. 9 is a flowchart illustrating an exemplary method of assembling a powertrain system for a commercial electric vehicle.

FIG. 9 is a flowchart illustrating an exemplary method 400 of assembling a powertrain system for a commercial electric vehicle. The powertrain system may be the same or similar to the examples described above in reference to FIGS. 1-8. The method 400 beings with providing an electric motor (operation 402) and providing a drive line configured to be operationally driven by the electric motor (operation 404).

A reducer assembly is joined to a multi-speed transmission (operation 406). The reducer assembly and the multi-speed transmission may be the same or similar to the configurations described above. In an example, the multi-speed transmission includes a drive shaft rotatable around a first axis. A main shaft co-axial with the drive shaft and having a first end and a second end. At least two selectable output ratios supported by at least one of the main shaft and the drive shaft. At least one sliding dog clutch supported on the main shaft and configured to selectively engage a gear of the at least two selectable output ratios. A cluster shaft is meshed with the at least two selectable output ratios. The cluster shaft is rotatable around a second axis that is offset from the first axis, and based on a position of the at least one sliding dog clutch, rotation of the drive shaft is transmitted through the cluster shaft and into rotation of the main shaft. The reducer assembly receives the second end of the main shaft and includes a reducer pinion supported proximate the second end of the main shaft, and an output shaft drivingly engaged with the reducer pinion. The output shaft is configured to rotate around a third axis that is offset from the first axis and couple to the drive line.

The reducer assembly and multi-speed transmission is then coupled between the electric motor and the drive line (operation 408). The reducer assembly is configured to change rotational speed of the main shaft prior to reaching the drive line. In the example, the reducer assembly decreases rotational speed of the main shaft prior to reaching the drive line while maintain the gearing configuration and pitch line velocity efficiencies of the multi-speed transmission. In other examples, the reducer assembly may also increase rotational speed of the main shaft prior to reaching the drive line as required or desired.

In some examples, joining the reducer assembly to the multi-speed transmission includes orienting the reducer pinion having a first helix gear at an opposite angle direction relative to a second helix gear of the at least two selectable output ratios. This configuration increases load balance within the multi-speed transmission and reducer assembly configuration. In other examples, joining the reducer assembly to the multi-speed transmission includes co-axially aligning the cluster shaft and the output shaft. This configuration keeps the pitch line velocity of the reducer gearset manageable so as to increase operational longevity of the reducer assembly. In still other examples, joining the reducer assembly to the multi-speed transmission includes coupling a pair of idler gears between the reducer pinion and the output shaft. This configuration increases load distribution within the reducer assembly.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A powertrain system for a commercial electric vehicle comprising:
    an electric motor;
    a multi-speed transmission including:
        a drive shaft configured to rotate via the electric motor around a first axis;
        a main shaft co-axial with the drive shaft and having a first end and a second end;
        at least two selectable output ratios supported by at least one of the main shaft and the drive shaft;
        at least one sliding dog clutch supported on the main shaft and configured to selectively engage a gear of the at least two selectable output ratios; and
        a cluster shaft meshed with the at least two selectable output ratios, wherein the cluster shaft is configured to rotate around a second axis that is offset from the first axis, and wherein based on a position of the at least one sliding dog clutch, rotation of the drive shaft is transmitted through the cluster shaft and into rotation of the main shaft; and
    a reducer assembly configured to receive the second end of the main shaft, the reducer assembly including:
        a reducer pinion supported proximate the second end of the main shaft; and
        an output shaft drivingly engaged with the reducer pinion, wherein the output shaft is configured to rotate around a third axis that is offset from the first axis and couple to a drive line of the commercial electric vehicle, and wherein the reducer assembly changes rotational speed of the main shaft prior to reaching the drive line, and wherein the main shaft is a split shaft with a first shaft having a reduced diameter relative to a second shaft, the second shaft extending into the reducer assembly.

2. The powertrain system of claim 1, wherein the reducer assembly decreases rotational speed of the main shaft prior to reaching the drive line.

3. The powertrain system of claim 1, wherein the at least two selectable output ratios include a first helix gear and the reducer pinion is a second helix gear, the first helix gear having an opposite angle direction relative to the second helix gear.

4. The powertrain system of claim 1, wherein the main shaft and the output shaft are rotatably supported within the reducer assembly by thrust bearings.

5. The powertrain system of claim 4, wherein the drive shaft and the cluster shaft are rotatably supported within the multi-speed transmission by radial bearings.

6. The powertrain system of claim 1, wherein the cluster shaft and the output shaft are co-axial.

7. The powertrain system of claim 1, wherein the at least one sliding dog clutch has a plurality of axially extending projections, each projection having opposing radial sidewalls that taper in an axial direction.

8. The powertrain system of claim 1, wherein the reducer assembly further includes a pair of idler gears coupled between the reducer pinion and the output shaft.

9. The powertrain system of claim 1, wherein the output shaft has a greater diameter than the main shaft.

10. The powertrain system of claim 1, wherein the multi-speed transmission includes a main case housing and the reducer assembly includes a reducer case housing coupled to the main case housing, and wherein the main shaft extends between the main case housing and the reducer case housing.

11. The powertrain system of claim 1, wherein the multi-speed transmission is coupled in fluid communication with the reducer assembly.

12. The powertrain system of claim 1, further comprising an end yoke or a flange plate coupling the output shaft to the drive line.

13. The powertrain system of claim 10, wherein the cluster shaft includes a first end and a second end supported by bearings, the bearing of the second end of the cluster shaft is supported on the reducer case housing.

14. The powertrain system of claim 1, further comprising a spacer supporting a midpoint of the second shaft.

15. The powertrain system of claim 7, wherein each projection has a distal end that is of greater length than a proximal end at a side of the at least one sliding dog clutch.

16. The powertrain system of claim 1, wherein the output shaft at least partially projects out of a reducer case housing.

17. The powertrain system of claim 1, wherein the at least two selectable output ratios includes a first gear, the reducer pinon has an axial length greater than an axial length of the first gear.

18. The powertrain system of claim 9, wherein the diameter of output shaft is about 150% greater than the diameter of the main shaft.

19. The powertrain system of claim 8, wherein the pair of idler gears are supported on a reducer case housing and a diameter of each idler gear is between a diameter of the reducer pinion and the output shaft.

* * * * *